3,183,203
COMPOSITIONS AND SHAPED ARTICLES OF A SAPONIFIED ETHYLENE-VINYL ACETATE COPOLYMER AND A GLYCOL CONTAINING 3 TO 4 CARBON ATOMS

Yasuo Yoshimura and Masaru Takata, Kurashiki, Japan, assignors to Kurashiki Rayon Co., Ltd., Okayama, Japan, a corporation of Japan
No Drawing. Filed Aug. 23, 1961, Ser. No. 133,295
Claims priority, application Japan, Aug. 30, 1960, 35/36,278
3 Claims. (Cl. 260—33.4)

This invention relates to polymer compositions and it is more particularly concerned with formed polymer products having good transparency, water-resistance and mechanical properties.

Films and other formed or shaped products made from polyethylene generally have excellent water-resisting properties, but they have the drawback that their transparency is poor and their tendency to accumulate a static electrical charge is high. Films and other formed products made from polyvinyl alcohol, on the other hand, have good transparency and have a very low tendency to accumulate a static electrical charge but they have the drawback that their water-resisting properties are poor.

It is an object of this invention to provide a polymer composition which forms films and other shaped products which combine good transparency and water-resistance, high mechanical properties, and a very low tendency to accumulate a static electrical charge, thereby eliminating the drawbacks of the polymer products referred to above.

In accordance with this invention there is provided a polymer composition which fulfills the foregoing object and which comprises the combination of 2–40% by weight of a glycol containing 3 or 4 carbon atoms, e.g., butylene glycol and propylene glycol, and a saponified copolymer of ethylene and a vinyl ester of an organic monocarboxylic acid, e.g. vinyl acetate, with the ethylene content of the co-polymer at most being 65 mol percent. The term "saponified co-polymer" is used herein to designate a product in which more than 90% of ester-radicals of the co-polymer of ethylene and the vinyl ester have been converted into hydroxyl-radicals, e.g. by conventional saponification procedures.

Saponified copolymers or interpolymers of ethylene and organic monocarboxylic acids used in making the compositions of this invention are described, for example, in U.S. Patent No. 2,386,347 and in British Patent No. 634,140. The films of these copolymers, except those of high ethylene content, are comparatively hard, and their mechanical properties such as elongation, tear strength, and the like, are not sufficient for general commercial requirements. Use as a plasticizer of β-ethoxyadipate, tricresyl phosphate, dibutylphthalate, and the like is described, but these plasticizers are applicable only to those copolymers of more than 70 mol percent ethylene content. The copolymers of such high ethylene content have a low softening point and a transparency approaching that of polyethylene, and they are not generally suitable to form wrapping films, and the like. Moreover, to obtain such copolymers, high pressures of more than 100 atmospheres at 60° C., for example, are required, which is not industrially advantageous.

As a result of detailed studies of the saponified copolymers of ethylene and vinyl esters of organic monocarboxylic acids, and plasticizers for them, we have made the surprising discovery that films of markedly improved characteristics can be produced from those saponified copolymers of the character indicated which have an ethylene content of at most 65 mol percent, and more particularly 20 to 65 mol percent, when these copolymers are combined with 2–40% by weight of a glycol of 3–4 carbon atoms, more particularly butylene glycol or propylene glycol. When the ethylene content of saponified copolymers of ethylene and a vinyl ester is increased, their softening points are lowered, and they become soft, and their water-resisting properties are increased. However, their pliability is not sufficient for their use in forming wrapping film, and their elongations and tear strengths are not adequate. They are hardened at low temperatures such as 0–5° C. On the other hand, when the degree of saponification of saponified copolymers of ethylene and a vinyl ester is lowered, they likewise become soft, but they are hardened and their tensile strength is degraded at low temperatures such as 0–5° C. In the case of saponified ethylene-vinyl ester copolymers of 20 mol percent to 65 mol percent ethylene content, and more than 90% saponified, to which various glycols such as butylene-glycol, hexylene glycol, propylene-glycol, and triethanolamine were added, we discovered that butylene glycol and propylene glycol exhibited high affinity for the polymers and that the use of these last-named glycols produced products which were soft, did not harden at 0–5° C., and surprisingly, had distinctly improved mechanical properties. The glycols tested comprised the various isomers, but their action was substantially equal. Furthermore, while we have specifically mentioned saponified copolymers of vinyl acetate and ethylene of the characteristics indicated, the invention is fully applicable to such ethylene copolymers of other vinyl esters as described in the above-mentioned U.S. 2,386,347, particularly vinyl esters of lower alkyl fatty acids, e.g. fatty acids of up to 6 carbon atoms.

The term "saponified" as used herein is synonymous with "hydrolyzed," in accordance with the practice in this art and designates the replacement of ester radicals by hydroxyl radicals.

The invention will be further understood from the following specific examples of practical application. However, it will be understood that these examples are not to be construed as limiting the scope of the present invention in any manner. In the examples, all parts are by weight unless otherwise indicated.

Example 1

Butylene glycol in the amount of 10% by weight was added to a saponified ethylene-vinyl acetate copolymer containing 28 mol percent ethylene, with a degree of saponification of 98.6%, and the mixture was press-formed into a film at 180° C. by being placed between heating plates. The tensile strength of the film thus obtained was 4.43 kg./mm.$^2$, and it had an elongation of 303%, and a tear strength of 14.10 kg./mm., and its surface area increased 3.9% when it was immersed in water of 25° C. for 24 hours, with its water absorbency being 6.26% under the same conditions. As a control, the same saponified copolymer was made into a film without the addition of butylene-glycol. The strength of this film was found to be 5.20 kg./mm.$^2$, and it had an elongation of 9%, and a tear strength of 1.23 kg./mm., and its surface area increased 6.15% when it was immersed in water of 25° C. for 24 hours, its water absorbency being 7.44% under the same conditions.

Example 2

Butylene glycol in the amount of 20% by weight was added to the same saponified copolymer described in Example 1, and a film was formed from this mixture following the procedure of Example 1. The tensile strength of this film was found to be 2.93 kg./mm.$^2$, its elongation 335%, and its tear strength 18.55 kg./mm., and its surface area increased 1.3% when immersed in water of 25° C. for 24 hours, its water-absorbency being 2.18% under the same conditions. In addition, this film was soft and transparent, and underwent no change in pliability even when cooled to 0° C.

*Example 3*

Butylene glycol in the amount of 10% by weight was added to a saponified ethylene-vinyl acetate copolymer containing 38 mol percent ethylene (99.28% degree of saponification). The mixture was extruded at 140° C. through an extruder, and was then drawn to about twice its length on a forming roll to form a film. The tensile strength of this film was found to be 6.20 kg./mm.$^2$, and it had an elongation of 98.6%, and a tear strength of 99 kg./mm. No change in its softness was observed when it was cooled to 0° C.

*Example 4*

An ethylene-vinyl acetate copolymer containing 47 mol percent ethylene (99.74% degree of saponification) to which was added 15% by weight of butylene-glycol, was extruded at 140° C. through an extruder, and was drawn to twice its length on a forming roll to form a film. The tensile strength of the film was found to be 8.45 kg./mm.$^2$, with an elongation of 82.7%, and a tear strength of 89.6 kg./mm. A film formed by extruding the same saponified copolymer to which no butylene glycol was added was found to have a tensile strength of 6.48 kg./mm.$^2$, an elongation of 43.6%, and a tear strength of 6.2 kg./mm.

When the foregoing tests were repeated, using propylene glycol instead of butylene glycol, essentially the same results were obtained.

As shown by the foregoing examples, the addition of a $C_3$–$C_4$ glycol to a specified type of ethylene-vinyl ester copolymer in accordance with this invention appreciably improves the mechanical properties of shaped forms of the product, e.g. films, particularly the tear strength, an especially important property for a film, and the water resistance and pliability are increased. Another advantage in adding a $C_3$–$C_4$ glycol, e.g. butylene glycol or propylene glycol, is that by such addition, the melting viscosity of the composition is lowered and the forming operation is facilitated. An additional benefit from the use of glycols in combination with the copolymers specified is the lessening of static electrification. As is well known, high static electrification renders a film liable to contamination, and is therefore undesirable from the point of view of using such films for wrapping purposes.

The reading of the volt meter of a rotary static tester measuring the static electrification of film produced in accordance with this invention, in comparison with the same film without the $C_3$–$C_4$ glycol and in comparison with films of polyethylene and polyvinyl alcohol, show a marked decrease in the charge in the case of the films of the invention which contained the indicated quantity of butylene glycol.

| Film Composition | Ethylene content | Amount of butylene glycol added, percent | Charge |
|---|---|---|---|
| Polyethylene | 100% | 0 | 2,130 |
| Ethylene-vinyl ester copolymer | 47 mol percent | 0 | 96 |
| Do | 47 mol percent | 15 | 0-1 |
| Do | 38 mol percent | 0 | 70 |
| Do | 38 mol percent | 15 | 0-1 |
| Polyvinyl alcohol | 0% | 0 | 0-1 |

Generally speaking, as more ethylene glycol or propylene glycol is added, the product becomes softer and its elongation becomes greater. When the quantity of the glycol is reduced, relatively hard and less elongating films are obtained. It will be understood that the optimum quantity of the glycol for each particular copolymer will vary with the ethylene content of the saponified copolymer, the degree of saponification, and the properties desired in the films to be produced. Thus, a lesser amount of butylene glycol or propylene glycol within the range indicated is sufficient to produce identical softness in the films, as the ethylene content becomes higher and the degree of saponification becomes lower.

The conditions and the relative relationships set forth in the examples are those preferred in carrying out the process of this invention, but it will be understood that other conditions and relationships may be used within the scope of the invention. In general, unless otherwise indicated, conventional operations and techniques are suitably employed.

The copolymer-glycol compositions are suitably formed into shapes, such as films, by conventional techniques. Thus, films can be produced by the procedures described, for example, in Izard et al. U.S. Patent 2,236,061 and in Herrmann et al. U.S. Patent 2,837,770.

It will be understood that various changes and modifications may be made in the embodiments herein described without departing from the scope of the invention as defined in the appended claims. It is intended, therefore, that all matter contained in the foregoing description shall be interpreted as illustrative only and not as limitative of the invention.

We claim:

1. A composition effective to be formed into shaped articles consisting essentially of a saponified copolymer of ethylene and vinyl acetate, said copolymer containing 20 to 65 mol percent of ethylene and having a degree of saponification of more than 90%, and an amount of a glycol containing 3 to 4 carbon atoms sufficient to impart anti-static properties to said copolymer.

2. A composition effective to be formed into shaped articles consisting essentially of a saponified copolymer of ethylene and vinyl acetate, said copolymer containing 20 to 65 mol percent of ethylene and having a degree of saponification of more than 90%, and 2 to 40% by weight of a glycol containing 3 to 4 carbon atoms.

3. A shaped article formed from a saponified copolymer of ethylene and vinyl acetate, said copolymer consisting essentially of 20 to 65 mol percent of ethylene and having a degree of saponification of more than 90%, and an amount of a glycol containing 3 to 4 carbon atoms sufficient to impart anti-static properties to said copolymer.

References Cited by the Examiner

UNITED STATES PATENTS

| 2,386,347 | 10/45 | Roland | 260—87.3 |
| 2,525,691 | 10/50 | Lee et al. | 260—33.4 |
| 2,690,407 | 9/54 | Pessel | |
| 2,879,244 | 3/59 | Coler | 260—33.4 |
| 2,980,964 | 4/61 | Dilke | 260–33.2 |

ALEXANDER H. BRODMERKEL, *Primary Examiner.*

WILLIAM H. SHORT, MORRIS LIEBMAN, *Examiners.*